United States Patent
Otani et al.

(10) Patent No.: US 10,195,903 B2
(45) Date of Patent: *Feb. 5, 2019

(54) PNEUMATIC MOTORCYCLE TIRE

(71) Applicants: Sumitomo Rubber Industries, Ltd., Kobe-shi, Hyogo (JP); The Goodyear Tire & Rubber Company, Akron, OH (US)

(72) Inventors: Masafumi Otani, Kobe (JP); Sebastien Willy Fontaine, Akron, OH (US); Armand Rene Gabriel Leconte, Akron, OH (US); Julien Michel Sylvain Seguy, Akron, OH (US); Jean-Luc Faure, Akron, OH (US); Auguste Elichiry, Akron, OH (US)

(73) Assignees: SUMITOMO RUBBER INDUSTRIES, LTD., Kobe-Shi, Hyogo (JP); THE GOODYEAR TIRE & RUBBER COMPANY, Akron, OH (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/010,751

(22) Filed: Jan. 29, 2016

(65) Prior Publication Data
US 2016/0221398 A1 Aug. 4, 2016

(30) Foreign Application Priority Data

Jan. 30, 2015 (JP) ................................. 2015-017900

(51) Int. Cl.
*B60C 11/03* (2006.01)

(52) U.S. Cl.
CPC ........ *B60C 11/0302* (2013.01); *B60C 11/032* (2013.01); *B60C 11/033* (2013.01);
(Continued)

(58) Field of Classification Search
CPC ....................... B60C 11/0304; B60C 11/0302
See application file for complete search history.

(56) References Cited

U.S. PATENT DOCUMENTS

D717,235 S * 11/2014 Fontaine ..................... D12/535
D717,724 S * 11/2014 Fontaine ..................... D12/535
(Continued)

FOREIGN PATENT DOCUMENTS

CN 202138161 U * 2/2012
JP 2013-519562 A 5/2013

*Primary Examiner* — Edmund H Lee
*Assistant Examiner* — Nicholas R Krasnow
(74) *Attorney, Agent, or Firm* — Birch, Stewart, Kolasch & Birch, LLP

(57) ABSTRACT

A pneumatic motorcycle tire 1 is provided with a tread pattern having an intended tire rotational direction N. The tread portion 2 is provided on each side of the tire equator C with a unit pattern 9 repeatedly arranged in the tire circumferential direction to form the tread pattern. The unit pattern 9 comprises: a first oblique groove 11 extending axially outwardly from a vicinity of the tire equator C and obliquely, while inclining to the rotational direction N; a second oblique groove 12 disposed on the toe-side in the rotational direction N of the first oblique groove 11 and extending therealong; and a narrow oblique groove 15 extending axially outwardly from the axially inner end of the first oblique groove 11 to the axially inner end of the second oblique groove 12, while inclining to the opposite direction to the rotational direction N.

24 Claims, 5 Drawing Sheets

(52) U.S. Cl.
CPC ... *B60C 11/0304* (2013.01); *B60C 2011/0334* (2013.01); *B60C 2011/0374* (2013.01); *B60C 2011/0376* (2013.01); *B60C 2011/0379* (2013.01); *B60C 2011/0381* (2013.01); *B60C 2200/10* (2013.01)

(56) References Cited

U.S. PATENT DOCUMENTS

| | | | | |
|---|---|---|---|---|
| D754,586 | S | * | 4/2016 | Otani .......................... D12/535 |
| 2006/0219342 | A1 | * | 10/2006 | Steinbach ........... B60C 11/0302 152/209.11 |
| 2012/0285593 | A1 | * | 11/2012 | Mariani .............. B60C 11/0302 152/209.8 |
| 2013/0206296 | A1 | | 8/2013 | Bestgen |
| 2013/0206300 | A1 | * | 8/2013 | Matsunami ............. B60C 11/13 152/209.19 |
| 2013/0228256 | A1 | * | 9/2013 | Shibamoto .......... B60C 11/0304 152/209.8 |
| 2014/0102608 | A1 | * | 4/2014 | Kato .................. B60C 11/0302 152/209.8 |

* cited by examiner

PNEUMATIC MOTORCYCLE TIRE

BACKGROUND OF THE INVENTION

The present invention relates to a pneumatic motorcycle tire, more particularly to a tread pattern capable of improving wet performance and ride comfort, and handling stability in good balance.

Pneumatic motorcycle tires having good wet performance and ride comfort are required in the market.

For example, by providing wide grooves in the tread portion of a pneumatic motorcycle tire, the rigidity of the tread portion is reduced and the ride comfort can be improved together with the wet performance. However, the handling stability is liable to deteriorate.

SUMMARY OF THE INVENTION

It is therefore, an object of the present invention to provide a pneumatic motorcycle tire, in which the wet performance and ride comfort, and the handling stability are improved in good balance.

According to the present invention, a pneumatic motorcycle tire comprises a tread portion having right and left tread edges and provided with a unidirectional tread pattern for which an intended tire rotational direction is specified, wherein each of a right half tread of the tread portion defined between the tire equator and the right tread edge and a left half tread of the tread portion defined between the tire equator and the left tread edge is provided with a unit pattern repeatedly arranged in the tire circumferential direction so as to form the unidirectional tread pattern, and the unit pattern comprises a first oblique groove extending axially outwardly from a vicinity of the tire equator, while inclining to the intended tire rotational direction, a second oblique groove disposed on the toe-side in the tire rotational direction of the first oblique groove, and extending along the first oblique groove, and a narrow oblique groove extending axially outwardly from an axially inner end of the first oblique groove, while inclining to the opposite direction to the intended tire rotational direction, and connected to an axially inner end of the second oblique groove.

The pneumatic motorcycle tire according to the present invention may further include the following features (1)-(8):
(1) the angle of the narrow oblique groove with respect to the tire circumferential direction is in a range of from 10 to 35 degrees;
(2) the groove depth of the narrow oblique groove is in a range of from 40% to 70% of the groove depth of the first oblique groove;
(3) the groove width of the narrow oblique groove is in a range of from 1.0 to 2.0 mm;
(4) the narrow oblique groove is connected with the second oblique groove at a first axial position, and the narrow oblique groove is bent at a second axial position axially outside the first axial position, and then extends axially outwardly while inclining to the intended tire rotational direction;
(5) the second axial position is at an axial distance of at least 20 mm from the tire equator;
(6) in each of the right half tread and left half tread, when a developed axial width thereof is divided into five equal parts, a difference between land ratios in % of every two of the adjacent parts is not more than 7;
(7) the unit pattern further includes a third oblique groove disposed on the toe-side in the intended tire rotational direction of the second oblique groove and extending along the second oblique groove;
(8) the unit pattern further includes a fourth oblique groove disposed on the toe-side in the intended tire rotational direction of the third oblique groove and extending along the third oblique groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENT

An embodiments of the present invention will now be described in detail in conjunction with the accompanying drawings.

Figure 1:
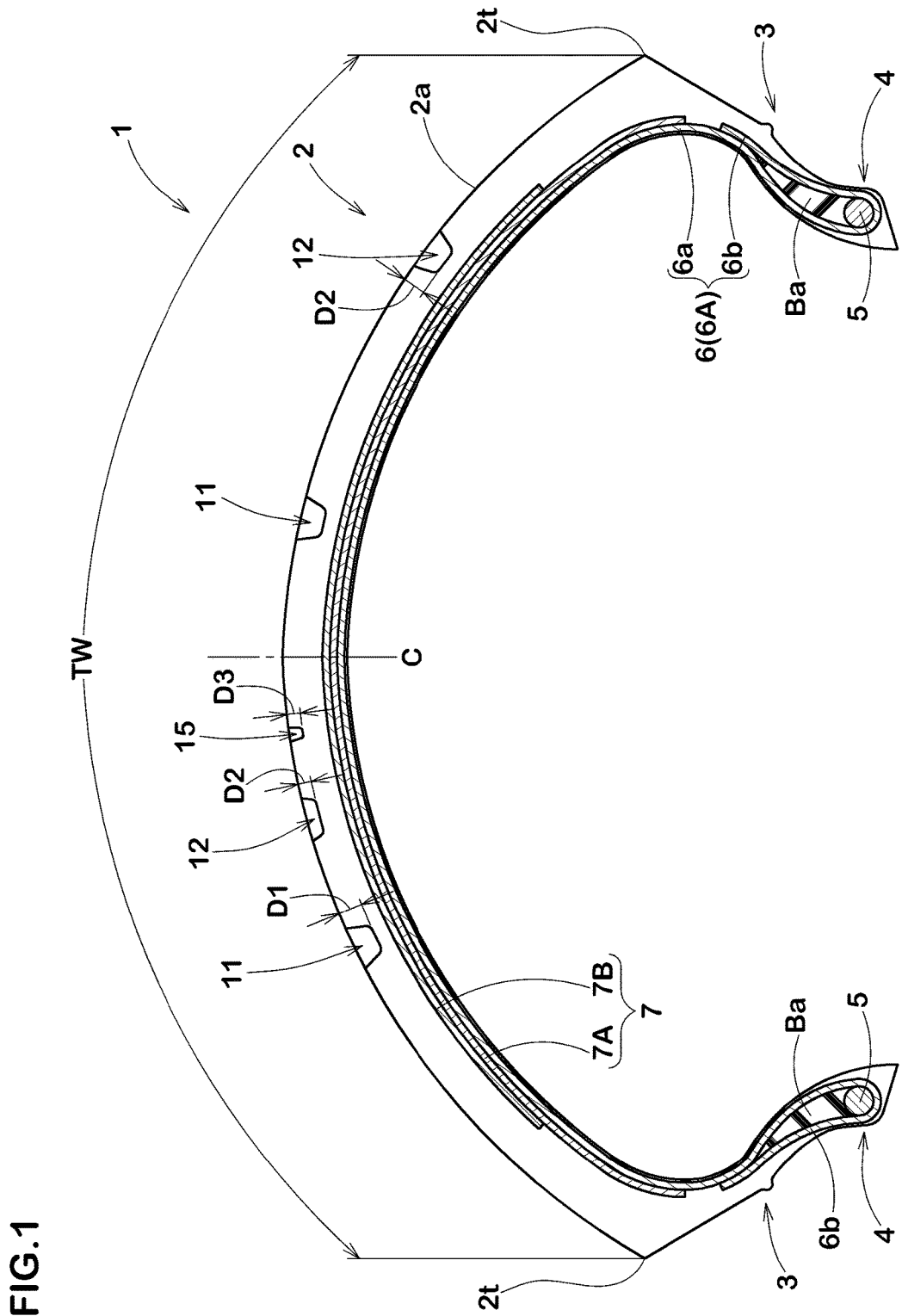
FIG. 1 is a cross sectional view of a pneumatic motorcycle tire as an embodiment of the present invention taken along line x-x of FIG. 2.

As shown in FIG. 1, a pneumatic motorcycle tire 1 as an embodiment of the present invention comprises a tread portion 2, a pair of axially spaced bead portions 4 each with a bead core 5 therein, a pair of sidewall portions 3 extending between the tread edges and the bead portions 4, a carcass 6 extending between the bead portions 4, and a tread reinforcing cord layer 7 disposed radially outside the carcass 6 in the tread portion 2.

As a characteristic of a motorcycle tire, the tread portion 2 (inclusive of the carcass 6, tread reinforcing cord layer 7 and a tread rubber thereon) is convexly curved so that the tread face 2a between the right and left tread edges 2t is curved like an arc swelling radially outwardly, and the maximum cross sectional width of the tire 1 occurs between the tread edges 2t, namely, equals to the axial tread width.

In the drawings, "TW" denotes the developed tread width, namely, the axial width between the tread edges 2t of the developed tread portion 2.

The carcass 6 in this example is composed of a single ply 6A of cords extending between the bead portions 4 through the tread portion 2 and the sidewall portions 3 and turned up around the bead core 5 in each bead portion 4 so as to form a pair of turned up portions 6b and a main portion 6a therebetween.

Between the main portion 6a and the turned up portion 6b in each of the bead portions 4, a bead apex Ba made of hard rubber is disposed.

The tread reinforcing cord layer 7 comprises a belt composed of at least one ply, in this embodiment, two radially inner and outer cross plies 7A and 7B of cords laid at an inclination angle in a range of from 5 to 40 degrees with respect to the tire equator C, for example.
For the belt cords, for example, steel cords, aramid cords, rayon cords and the like can be suitably used.

The tread portion 2 is provided with a unidirectional tread pattern for which an intended tire rotational direction N is specified. The intended tire rotational direction N is indicated in the outer surface of the tire, for example, in the sidewall portion 3.

Figure 2:
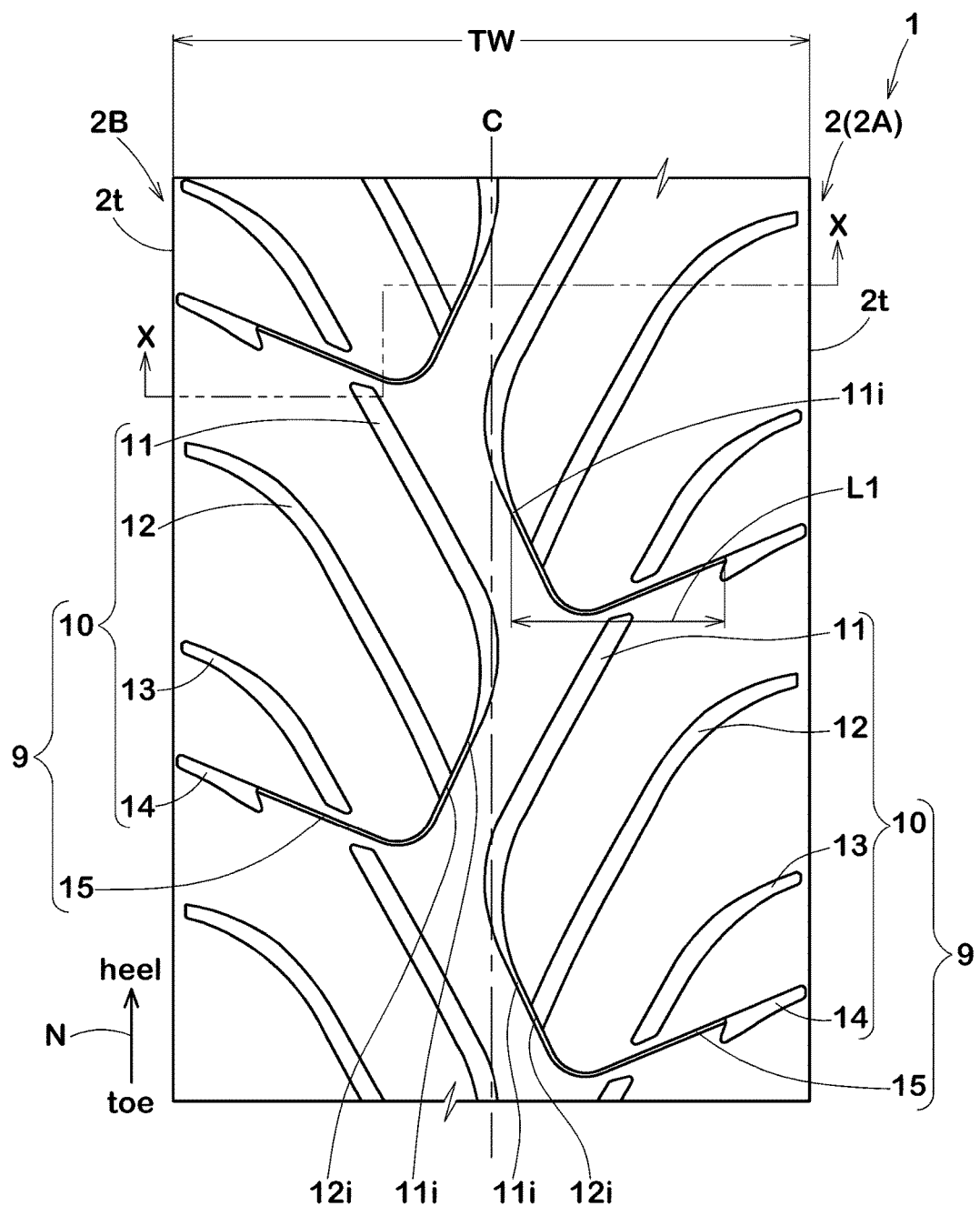
FIG. 2 is a developed partial view of the tread portion thereof showing an example of the tread pattern according to the present invention.

As shown in FIG. 2, in each of a right half tread 2A and a left half tread 2B of the tread portion 2, a unit pattern 9 is arranged repeatedly in the tire circumferential direction to form the unidirectional tread pattern.

The right half tread 2A is defined between the tire equator C and the right tread edge 2t. The left half tread 2B is defined between the tire equator C and the left tread edge 2t.

The unit pattern 9 comprises a plurality of oblique grooves 10 and a narrow oblique groove 15.

The tread pattern in this embodiment consists of the oblique grooves 10 and the narrow oblique grooves 15 of the repeated unit patterns 9. That is, no other grooves are included in this embodiment. But, in another embodiment, other grooves may be included.

The oblique grooves 10 are each defined as having a groove width of more than 2 mm. The narrow oblique groove 15 is defined as having a groove width of not more than 2 mm at the tread face 2a.

Figure 3:
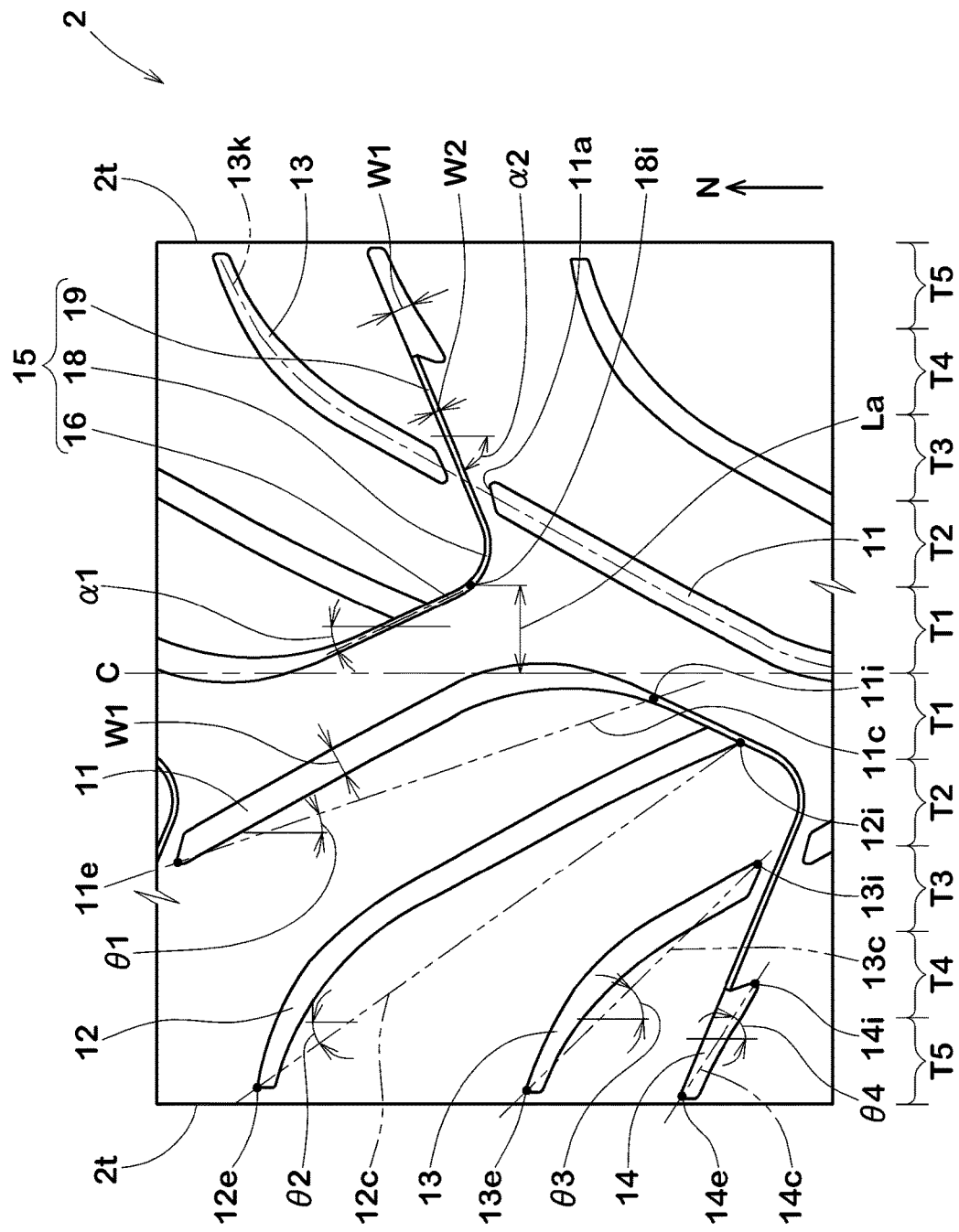
FIG. 3 is an enlarged developed partial view of the tread portion shown in FIG. 2.
Figure 4:
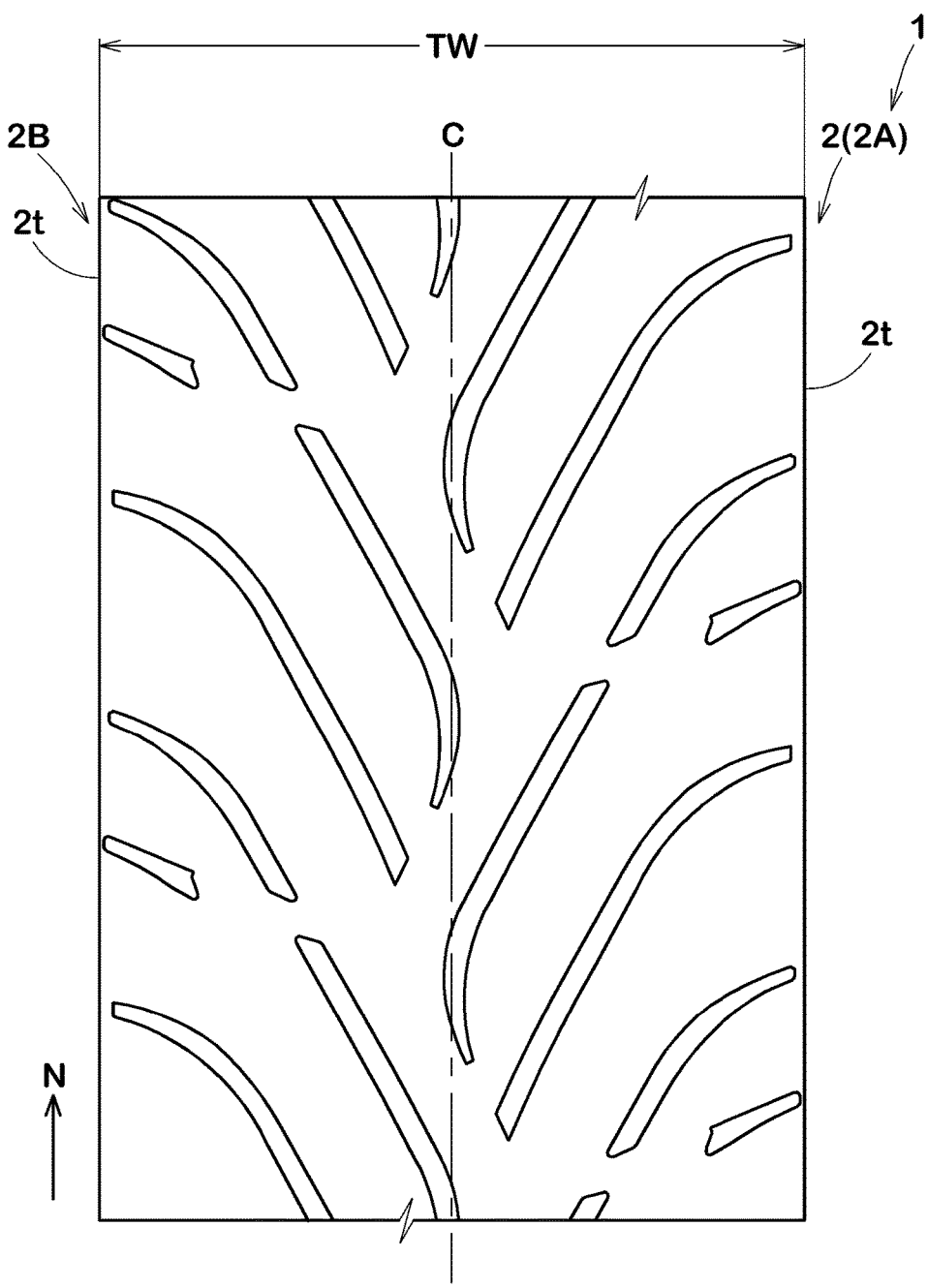
FIG. 4 is a developed partial view of the tread portion of a comparative example tire.
Figure 5:
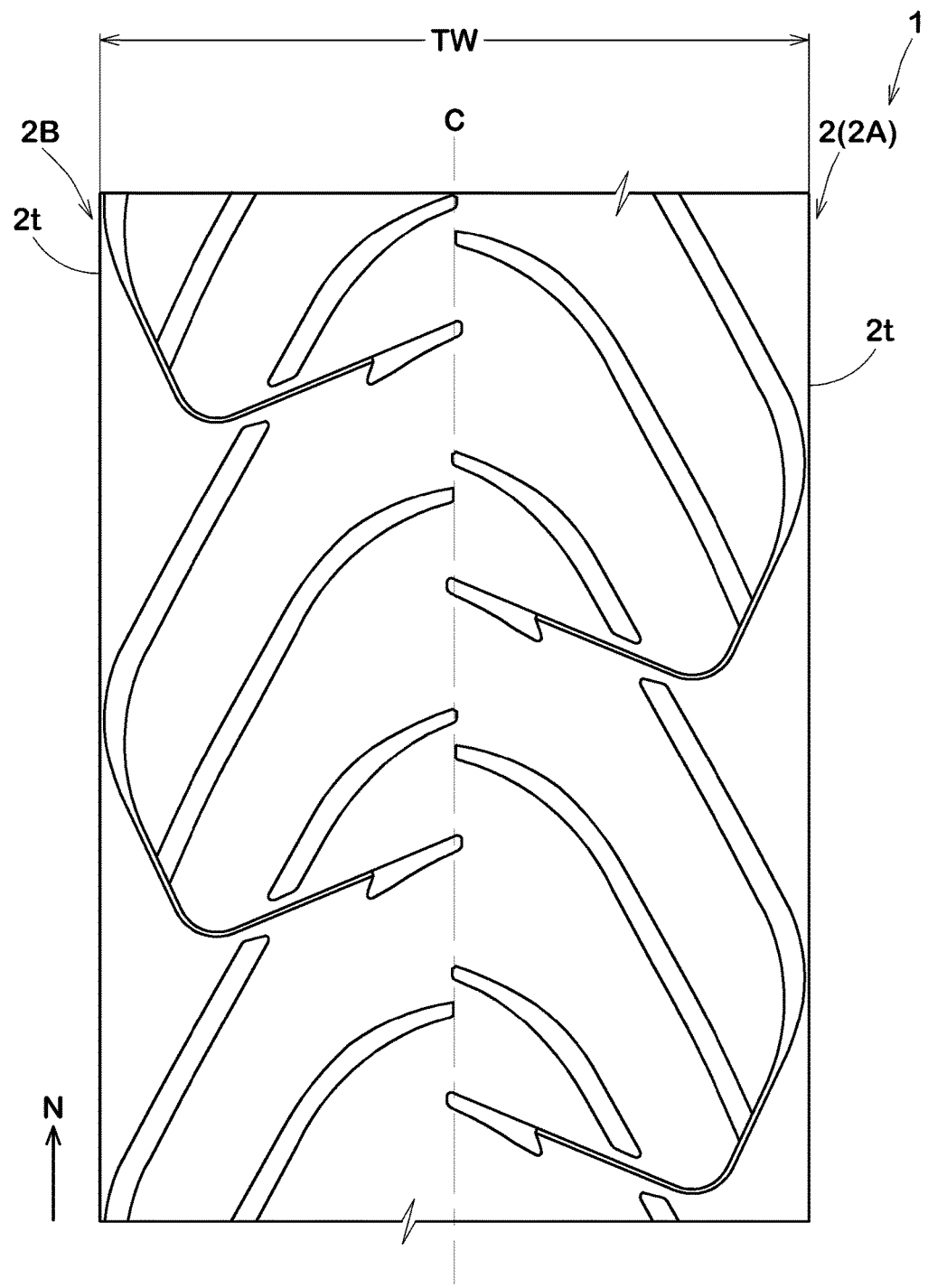
FIG. 5 is a developed partial view of the tread portion of another comparative example tire.

In this embodiment, as shown in FIG. 2 and FIG. 3, the oblique grooves 10 include a first oblique groove 11, a second oblique groove 12, a third oblique groove 13, and a fourth oblique groove 14.

The first oblique groove 11 extends axially outwardly from a vicinity of the tire equator C, while inclining to the intended tire rotational direction N.

In this embodiment, the first oblique groove 11 is composed of
a main portion extending substantially straight and axially outwardly from the tire equator C, while inclining with respect to the tire axial direction to the intended tire rotational direction N, and having an axially outer end defining the axially outermost end 11e of the first oblique groove 11, and
a curved portion extending from the axially inner end of the main portion toward the opposite direction to the intended tire rotational direction N, along the tire equator C for a short distance, and then obliquely toward the axially outside to the axially inner end of the first oblique groove 11, while gradually decreasing its groove width.

As shown in FIG. 3, if a first straight line 11c is drawn between the axially innermost end 11i and the axially outermost end 11e of the first oblique groove 11, the first straight line 11c is inclined with respect to the tire axial direction to one circumferential direction, and the first oblique groove 11 is convexed toward the intended tire rotational direction N from the first straight line 11c.

Such first oblique groove 11 provides good drainage from a straight running state of the motorcycle with almost zero camber angle to a turning state of the motorcycle with a small camber angle. Further, during turning, the first oblique groove 11 exerts an edge effect to improve the wet performance.

The second oblique groove 12 is disposed on the toe-side in the tire rotational direction N of the first oblique groove 11 and extends along the first oblique groove 11.
The axially innermost end 12i of the second oblique groove 12 is disposed axially outside the axially innermost end 11i of the first oblique groove 11.
The axially outermost end 12e of the second oblique groove 12 is positioned axially outside the axially outermost end 11e of the first oblique groove 11.

Such second oblique groove 12 provides good drainage from the straight running state to the turning state of the motorcycle, while maintaining the circumferential rigidity of a part of the tread portion 2 between the first oblique groove 11 and the second oblique groove 12.

In this embodiment, the second oblique groove 12 is composed of
a main portion extending substantially straight and axially outwardly from the above-mentioned axially innermost end 12i, while inclining with respect to the tire axial direction to the intended tire rotational direction N, and
an axially outer curved portion extending from the axially outer end of the main portion toward the adjacent tread edge 2t to the above-mentioned axially outer end of the second oblique groove 12, while gradually increasing its inclination angle with respect to the tire circumferential direction.

If a second straight line 12c is drawn between the axially innermost end 12i and the axially outermost end 12e of the second oblique groove 12, the second straight line 12c is inclined with respect to the tire axial direction to the same circumferential direction as that of the first straight line 11c. The second oblique groove 12 is convexed toward the intended tire rotational direction N from the second straight line 12c.

Preferably, the angle θ2 of the second straight line 12c with respect to the tire circumferential direction is more than the angle θ1 of the first straight line 11c with respect to the tire circumferential direction.

Such second oblique groove 12 provides good drainage from a running state with a small camber angle to a turning state with a large camber angle. Further, since the inclination angle of the second oblique groove 12 with respect to the tire axial direction is gradually decreased, the axial rigidity of the tread portion on both sides of the second oblique groove 12 is gradually increased, therefore, the handling stability during turning with a large camber angle is improved.

The angle θ1 of the first straight line 11c is preferably set in a range of from 12 to 28 degrees, more preferably 15 to 25 degrees.

The angle θ2 of the second straight line 12c is preferably set in a range of from 28 to 42 degrees, more preferably 30 to 40 degrees.

The difference between the angle θ2 and the angle θ1 is preferably not more than 25 degrees.

The third oblique groove 13 is disposed on the toe-side in the tire rotational direction N of the second oblique groove 12 and extends along the second oblique groove 12.

The axially innermost end 13i of the third oblique groove 13 is positioned axially outside the axially innermost end 12i of the second oblique groove 12.

The axially outermost end 13e of the third oblique groove 13 may be positioned axially outside the axially outermost end 12e of the second oblique groove 12. But, in this embodiment, they are positioned at substantially same axial position.

In this embodiment, the third oblique groove 13 is composed of
an axially inner portion extending substantially straight and axially outwardly from the above-mentioned axially innermost end 13i, while inclining with respect to the tire axial direction to the intended tire rotational direction N, and
an axially outer curved portion extending from the axially outer end of the axially inner portion toward the adjacent tread edge 2t to the above-mentioned axially outer end of the third oblique groove 13, while gradually increasing its inclination angle with respect to the tire circumferential direction.

The axially outer curved portion of the third oblique groove 13 has substantially same configuration as that of the axially outer curved portion of the second oblique groove 12, and they are substantially parallel with each other.

The axially inner portion of the third oblique groove 13 has a shorter length when compared with that of the main portion of the second oblique groove 12.

If a third straight line 13c is drawn between the axially innermost end 13i and the axially outermost end 13e of the third oblique groove 13, the third straight line 13c is inclined with respect to the tire axial direction to the same circumferential direction as that of the second straight line 12c. The third oblique groove 13 is convexed toward the intended tire rotational direction N from the third straight line 13c.

Such third oblique groove 13 provides good drainage from a turning state with a middle camber angle to a turning state with a large camber angle. Further, since the inclination angle of the third oblique groove 13 with respect to the tire axial direction is gradually decreased, the axial rigidity of the tread portion on both sides of the third oblique groove 13 is gradually increased, therefore, the handling stability during turning with a large camber angle is improved.

Preferably, the angle θ3 of the third straight line 13c with respect to the tire circumferential direction is more than the angle θ2 of the second straight line 12c with respect to the tire circumferential direction.

The difference between the angle θ3 and the angle θ2 is preferably not more than 25 degrees.

The angle θ3 of the third straight line 13c is preferably set in a range of from 35 to 50 degrees, more preferably 37 to 47 degrees.

It is preferable that, on both sides of the narrow oblique groove 15, the third oblique groove 13 (the axially inner portion) is aligned with the first oblique groove 11 (the main portion) of the next unit pattern 9 on the toe-side in the tire rotational direction as if the first oblique groove 11 and the third oblique groove 13 are continuous.

More specifically, an extension of the widthwise center line 13k of the third oblique groove 13 intersects the axially inner end 11a of the first oblique groove 11.

In comparison with a long oblique groove extending from the tire equator to the vicinity of the tread edge, such groove arrangement can increase the rigidity of a middle tread portion, and the handling stability can be improved, without sacrificing the drainage performance.

The fourth oblique groove 14 is disposed on the toe-side in the tire rotational direction N of the third oblique groove 13. The fourth oblique groove 14 is inclined with respect to the tire axial direction to the same circumferential direction as the third oblique groove 13.

The axially innermost end 14i of the fourth oblique groove 14 is positioned axially outside the axially innermost end 13i of the third oblique groove 13.

The axially outermost end 14e of the fourth oblique groove 14 may be positioned axially outside the axially outermost end 13e of the third oblique groove 13. But, in this embodiment, they are positioned at substantially same axial position, therefore, good drainage performance can be obtained without excessively decreasing the rigidity in the vicinity of the tread edge 2t.

If a fourth straight line 14c is drawn between the axially innermost end 14i and the axially outermost end 14e of the fourth oblique groove 14, the fourth straight line 14c is inclined with respect to the tire axial direction to the same circumferential direction as that of the third straight line 13c.

Preferably, the angle θ4 of the fourth straight line 14c with respect to the tire circumferential direction is more than the angle θ3 of the third straight line 13c with respect to the tire circumferential direction.

The difference between the angle θ4 and the angle θ3 is preferably not more than 25 degrees.

The angle θ4 of the fourth straight line 14c is preferably 50 to 65 degrees, more preferably 53 to 63 degrees.

As described above, the angles θ1, θ2, θ3 and θ4 of the first-fourth straight lines 11c, 12c, 13c and 14c are gradually increased. As a result, with the increase in the camber angle, the axial rigidity of the tread portion (ground contacting part) is increased, and the handling stability is improved. Further, the drainage performance is improved.

In order to improve the wet performance and handling stability in good balance, the averaged groove width W1 of each of the oblique grooves 10 (11-14) is preferably set in a range of from 1.5% to 4.5% of the developed tread width TW.

The groove depths D1 of the oblique grooves 10 are, for example, set in a range of from 3 to 10 mm. The groove depth D1 may be constant or varied, for example, gradually decreased or increased toward the axially inner end.

In this embodiment, in order to increase the rigidity of the tread portion 2 and thereby to improve the handling stability, the groove depth D2 of the second oblique groove 12 is gradually decreased towards the axially inside. Preferable, the minimum value of the groove depth D2 is set in a range of from 40% to 70% of the groove depth D1 of the first oblique groove 11.

The narrow oblique groove 15 comprises
an axially inner part 16 extending substantially straight and axially outwardly from the axially inner end of the first oblique groove 11, while inclining to the opposite direction to the tire rotational direction N, and
an axially outer part 19 extending substantially straight and axially outwardly from the axially outer end of the axially inner part 16 through a curved part 18, while inclining to the tire rotational direction N. The curved part 18 is curved so as to connect between the axially inner part 16 and the axially outer part 19 smoothly without inflection points.

Such narrow oblique groove 15 exerts its edge effect multidirectionally to improve the handling stability. Further, the narrow oblique groove 15 reduces the rigidity of the tread portion, therefore, shocks and vibrations when passing over seams of asphalt and rough road surfaces can be reduced, and the ride comfort is improved.

In this embodiment, the narrow oblique groove 15 is defined as having a substantially constant width of not more than 2 mm.

The axially outer end of the axially outer part 19 is connected to the fourth oblique groove 14 in order to improve the drainage performance.

In this embodiment, one of the groove edges of the axially outer part 19 and one of the groove edges of the fourth oblique groove 14 are arranged in line.

The axially outermost end of the axially outer part 19, namely, that of the narrow oblique groove 15 is positioned axially outside the axially innermost end 14i of the fourth oblique groove 14.

Preferably, the angle $\alpha 1$ of the axially inner part 16 with respect to the tire circumferential direction is set in a range of from 10 to 35 degrees.

If the angle $\alpha 1$ is less than 10 degrees, since the circumferential component of the edges of the axially inner part 16 is decreased, there is a possibility that the handling stability is deteriorated. If the angle $\alpha 1$ is more than 35 degrees, there is a possibility that the drainage performance during straight running is deteriorated.

It is preferable that the angle $\alpha 2$ of the axially outer part 19 with respect to the tire circumferential direction is set in a range of from 65 to 85 degrees.

In the course from the axially inner part 16 to the axially outer part 19, a position of the narrow oblique groove 15 at which the angle of the narrow oblique groove 15 with respect to the tire circumferential direction becomes more than 35 degrees is defined as an axially innermost end 18i of the curved part 18. Such axially innermost end 18i is preferably positioned at an axial distance La of at least 20 mm from the tire equator C in order to maintain necessary rigidity for the tread center region and not to deteriorate the handling stability.

The axially inner part 16 of the narrow oblique groove 15 is, at a middle of the length thereof, connected with the axially inner end of the second oblique groove 12, namely, the second oblique groove 12 is not extended beyond the axially inner part 16 in order not to reduce the rigidity in the vicinity of the groove junction and thereby not to deteriorate the handling stability.

Preferably, the groove depth D3 of the narrow oblique groove 15 and the groove depth of the second oblique groove 12 are the same at the junction therebetween in order to expedite the drainage and in order not to decrease the strength of the tread portion 2 at the junction.

Preferably, the groove depth D3 of the narrow oblique groove 15 is set in a range of from 40% to 70% of the groove depth D1 of the first oblique groove 11 in order to improve the wet performance, handling stability and ride comfort in a well balanced manner.

Preferably, the groove width W2 of the narrow oblique groove 15 is not less than 1.0 mm.

If less than 1.0 mm, the drainage performance is deteriorated, and there is a possibility that the ride comfort can not be improved because the tread rigidity can not be effectively decreased, and the tread portion can not deflect sufficiently to absorb shocks and vibrations caused by rough road surfaces and the like.

If the groove width W2 is more than 2.0 mm, there is a possibility that the tread rigidity is excessively decreased, and the handling stability is deteriorated.

In order to effectively derive such advantageous effects, the developed axial length L1 of the narrow oblique groove 15 (shown in FIG. 2) is preferably set in a range of from 20% to 40% of the developed tread width TW.

As shown in FIG. 3, if the developed axial width of each of the right half tread 2A and left half tread 2B is divided into five equal parts, namely, a first region T1, a second region T2, a third region T3, a fourth region T4 and a fifth region T5 arranged in this order from the tire equator C to the tread edge 2t, in each of the first and left half treads 2A and 2B, land ratios S1, S2, S3, S4 and S5 (%) of the respective first-fifth regions T1, T2, T3, T3 and T5 satisfy the following conditions:
the difference between S2 and S1 is not more than 7,
the difference between S3 and S2 is not more than 7,
the difference between S4 and S3 is not more than 7, and
the difference between S5 and S4 is not more than 7,
namely, the difference between the land ratios of the adjacent regions or parts is set in a range of not more than 7, preferably not more than 5 in order to uniform the deflection of the tire 1 from a straight running state with almost zero camber angle to a turning state of the largely leant motorcycle with a large camber angle, and thereby to improve the ride comfort. Incidentally, the land ratio of a region is a ratio (%) of the ground contacting area of the region to the overall area of the region.

It is preferable that the land ratios S1-S5 (%) of the first-fifth regions T1-T5 further satisfy the following condition:

$$S1<S2<S3<S4<S5.$$

Further, it is preferable that
the land ratio S1 is in a range of from 75% to 85%,
the land ratio S2 is in a range of from 77% to 87%,
the land ratio S3 is in a range of from 80% to 90%,
the land ratio S4 is in a range of from 82% to 92%, and
the land ratio S5 is in a range of from 85% to 95%.

Thus, the rigidity in the first region T1 contacting with the ground during straight running is relatively decreased, therefore, the ride comfort during straight running can be improved. Incidentally, the motorcycle is most stable during straight running, therefore, such decrease in the rigidity in the first region T1 is not affect other performances.

In contrast, the motorcycle is unstable during turning with the fifth region T5 contacting with the ground, therefore, the land ratio S5 is maximized to increase the rigidity in the fifth region T5 and thereby to improve the handling stability when the motorcycle is largely leant.

In this embodiment, as shown in FIG. 1, each of the axially outer ends of the oblique grooves 10 (11, 12, 13 and 14) is a closed end.
The axially inner end of the first oblique groove 11 is positioned within the first region T1.
The axially outer end of the first oblique groove 11 is positioned within the second or third region T2 or T3, in this example, on the boundary therebetween.
The axially inner end of the second oblique groove 12 is positioned within the first or second region T1 or T2, in this example, within the first region T1.
The axially inner end of the third oblique groove 13 is a closed end positioned within the third region T3.
The axially outer end of the forth oblique groove 14 is positioned within the forth region T4.

The above described tread pattern, land ratios S1-S5 and structure are optimized for a front wheel (idle wheel not to contribute to the driving force) whose ground pressure is relatively low in comparison with the rear wheel in order to improve the handling stability, wet performance and ride comfort in a well balanced manner. Thus, the pneumatic motorcycle tire 1 according to the present embodiment can be suitably used for a front wheel of a motorcycle.

Comparison Tests

Based on the structure shown in FIG. 1, motorcycle tires of size 120/70ZR17 were experimentally manufactured according to specifications listed in Table 1 and tested for the handling stability, wet performance and ride comfort.

<Handling Stability and Ride Comfort>

Each test tire was mounted on the front wheel of a 1300 cc motorcycle. (Tire pressure 250 kPa) Then, during running on a dry asphalt road surface of a circuit test course, a test rider evaluated the handling stability based on handle response and cornering performance such as road grip. Further, the test rider evaluated the ride comfort based on shocks and vibrations when passing over seams of the asphalt and rough road surfaces. The test results are indicated in Table 1 by an index based on Embodiment tire Ex. 1 being 100, wherein the larger the value, the better the performance.

<Wet Performance>

Using the above-mentioned motorcycle, the test rider evaluated the wet performance based on handling response, cornering performance, traction performance and road-grip performance when running on a wet asphalt road surface of a test course covered with 5 mm depth water.

The results are indicated in Table 1 by an index based on Embodiment tire Ex. 1 being 100, wherein the larger the value, the better the performance.

TABLE 1

| Tire | Ref. 1 | Ref. 2 | Ex. 1 | Ex. 2 | Ex. 3 | Ex. 4 | Ex. 5 | Ex. 6 | Ex. 8 | Ex. 7 |
|---|---|---|---|---|---|---|---|---|---|---|
| tread pattern (FIG. No.) 1st-4th oblique grooves | 4 | 5 | 2 | 2 | 2 | 2 | 2 | 2 | 2 | 2 |
| maximum depth (mm) narrow oblique groove | 4.5 | 4.5 | 4.5 | 4.5 | 4.5 | 4.5 | 4.5 | 4.5 | 4.5 | 4.5 |
| angle α1 (deg.) | 25 | 25 | 25 | 5 | 10 | 35 | 40 | 25 | 25 | 25 |
| depth ratio D3/D1 (%) | 56 | 56 | 56 | 56 | 56 | 56 | 56 | 35 | 70 | 40 |
| width W2 (mm) | 1.2 | 1.2 | 1.2 | 1.2 | 1.2 | 1.2 | 1.2 | 1.2 | 1.2 | 1.2 |
| distance La (mm) | 20 | 45 | 20 | 20 | 20 | 20 | 20 | 20 | 20 | 20 |
| handling stability | 95 | 90 | 100 | 95 | 97 | 100 | 102 | 102 | 98 | 100 |
| wet performance | 95 | 95 | 100 | 102 | 100 | 98 | 96 | 97 | 103 | 98 |
| ride comfort | 95 | 95 | 100 | 100 | 100 | 100 | 98 | 98 | 102 | 100 |

| Tire | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| tread pattern (FIG. No.) 1st-4th oblique grooves | 2 | 2 | 2 | 2 | 2 | 2 | 2 | 2 | 2 |
| maximum depth (mm) narrow oblique groove | 4.5 | 4.5 | 4.5 | 4.5 | 4.5 | 4.5 | 4.5 | 4.5 | 4.5 |
| angle α1 (deg.) | 25 | 25 | 25 | 25 | 25 | 25 | 25 | 25 | 25 |
| depth ratio D3/D1 (%) | 75 | 56 | 56 | 56 | 56 | 56 | 56 | 56 | 56 |
| width W2 (mm) | 1.2 | 0.8 | 1.0 | 2.0 | 2.5 | 1.2 | 1.2 | 1.2 | 1.2 |
| distance La (mm) | 20 | 20 | 20 | 20 | 20 | 5 | 10 | 25 | 30 |
| handling stability | 95 | 104 | 102 | 98 | 96 | 98 | 100 | 98 | 96 |
| wet performance | 105 | 97 | 98 | 102 | 104 | 98 | 100 | 100 | 100 |
| ride comfort | 105 | 96 | 98 | 102 | 104 | 98 | 98 | 102 | 104 |

While detailed description has been made of an especially preferable embodiment of the present invention, the present invention can be embodied in various forms without limited to the illustrated embodiment.

The invention claimed is:

1. A pneumatic motorcycle tire comprising
a tread portion having right and left tread edges and provided with a unidirectional tread pattern for which an intended tire rotational direction is specified,
wherein
a right half tread of the tread portion defined between the tire equator and the right tread edge and a left half tread of the tread portion defined between the tire equator and the left tread edge are each provided with a unit pattern repeatedly arranged in the tire circumferential direction so as to form the unidirectional tread pattern, and
the unit pattern comprises
a first oblique groove comprising a main portion extending substantially straight and axially outwardly from the tire equator, while inclining with respect to the tire axial direction to the intended tire rotational direction,
a second oblique groove disposed on a toe-side in the tire rotational direction of the first oblique groove, and extending along the first oblique groove, while inclining with respect to the tire axial direction to the intended tire rotational direction, and
a narrow oblique groove comprising an axially inner part, an axially outer part and a curved part extending therebetween,
wherein
the axially inner part of the narrow oblique groove extends substantially straight axially outwardly from an axially inner end of the first oblique groove, while inclining with respect to the tire axial direction to the opposite direction to the intended tire rotational direction,
the curved part of the narrow oblique groove extends from an axially outer end of the axially inner part to an axially inner end of the axially outer part, while turning toward the intended tire rotational direction, the axially outer part of the narrow oblique groove extends substantially straight axially outwardly from the curved part, while inclining with respect to the tire axial direction to the intended tire rotational direction, and an axially inner end of the second oblique groove is connected to the axially inner part of the narrow oblique groove, wherein the first oblique groove comprises a curved portion extending from the axially inner end of the main portion of the first oblique groove toward the opposite direction to the intended tire rotational direction, on and along the tire equator, and then extending obliquely toward the axially outside off the tire equator to an axially inner end of the first oblique groove, while gradually decreasing its groove width, and wherein the unit patterns repeatedly arranged in the right half tread and the left half tread are staggered along the tire equator, and the first oblique grooves of the unit patterns extend from respective positions on the tire equator alternately toward the right tread edge and the left tread edge.

2. The pneumatic motorcycle tire according to claim 1, wherein the angle of the axially inner part of the narrow oblique groove with respect to the tire circumferential direction is in a range of from 10 to 35 degrees.

3. The pneumatic motorcycle tire according to claim 1, wherein the groove depth of the narrow oblique groove is in a range of from 40% to 70% of the groove depth of the first oblique groove.

4. The pneumatic motorcycle tire according to claim 1, wherein the groove width of the narrow oblique groove is in a range of from 1.0 to 2.0 mm.

5. The pneumatic motorcycle tire according to claim 1, wherein a first axial position at which the axially inner part of the narrow oblique groove is connected with the second oblique groove is axially inside a second axial position at which the axially inner part is connected to the curved part.

6. The pneumatic motorcycle tire according to claim 5, wherein the second axial position is at an axial distance of at least 20 mm from the tire equator.

7. The pneumatic motorcycle tire according to claim 1, wherein in each of the right half tread and left half tread, when a developed axial width thereof is divided into five equal parts, a difference between land ratios in % of every two of the adjacent parts is not more than 7.

8. The pneumatic motorcycle tire according to claim 1, wherein the unit pattern further includes a third oblique groove disposed on the toe-side in the intended tire rotational direction of the second oblique groove and extending axially outwardly along the second oblique groove while inclining with respect to the tire axial direction to the intended tire rotational direction.

9. The pneumatic motorcycle tire according to claim 8, wherein the unit pattern further includes a fourth oblique groove disposed on the toe-side in the intended tire rotational direction of the third oblique groove and extending axially outwardly along the third oblique groove while inclining with respect to the tire axial direction to the intended tire rotational direction, and an axially outer end of the axially outer part of the narrow oblique groove is connected to an axially inner end of the fourth oblique groove.

10. The pneumatic motorcycle tire according to claim 2, wherein the groove depth of the narrow oblique groove is in a range of from 40% to 70% of the groove depth of the first oblique groove.

11. The pneumatic motorcycle tire according to claim 2, wherein the groove width of the narrow oblique groove is in a range of from 1.0 to 2.0 mm.

12. The pneumatic motorcycle tire according to claim 3, wherein the groove width of the narrow oblique groove is in a range of from 1.0 to 2.0 mm.

13. The pneumatic motorcycle tire according to claim 2, wherein a first axial position at which the axially inner part of the narrow oblique groove is connected with the second oblique groove is axially inside a second axial position at which the axially inner part is connected to the curved part.

14. The pneumatic motorcycle tire according to claim 3, wherein a first axial position at which the axially inner part of the narrow oblique groove is connected with the second oblique groove is axially inside a second axial position at which the axially inner part is connected to the curved part.

15. The pneumatic motorcycle tire according to claim 4, wherein a first axial position at which the axially inner part of the narrow oblique groove is connected with the second oblique groove is axially inside a second axial position at which the axially inner part is connected to the curved part.

16. The pneumatic motorcycle tire according to claim 2, wherein in each of the right half tread and left half tread, when a developed axial width thereof is divided into five equal parts, a difference between land ratios in % of every two of the adjacent parts is not more than 7.

17. The pneumatic motorcycle tire according to claim 3, wherein in each of the right half tread and left half tread, when a developed axial width thereof is divided into five equal parts, a difference between land ratios in % of every two of the adjacent parts is not more than 7.

18. The pneumatic motorcycle tire according to claim 4, wherein in each of the right half tread and left half tread, when a developed axial width thereof is divided into five equal parts, a difference between land ratios in % of every two of the adjacent parts is not more than 7.

19. The pneumatic motorcycle tire according to claim 5, wherein in each of the right half tread and left half tread, when a developed axial width thereof is divided into five equal parts, a difference between land ratios in % of every two of the adjacent parts is not more than 7.

20. The pneumatic motorcycle tire according to claim 6, wherein in each of the right half tread and left half tread, when a developed axial width thereof is divided into five equal parts, a difference between land ratios in % of every two of the adjacent parts is not more than 7.

21. The pneumatic motorcycle tire according to claim 5, wherein the unit pattern further includes a third oblique groove disposed on the toe-side in the intended tire rotational direction of the second oblique groove and extending along the second oblique groove while inclining with respect to the tire axial direction to the intended tire rotational direction, and a fourth oblique groove disposed on the toe-side in the intended tire rotational direction of the third oblique groove and extending axially outwardly along the third oblique groove while inclining with respect to the tire axial direction to the intended tire rotational direction, and an axially outer end of the axially outer part of the narrow oblique groove is connected to the fourth oblique groove.

22. The pneumatic motorcycle tire according to claim 21, wherein one of the groove edges of the axially outer part of the narrow oblique groove and one of the groove edges of the fourth oblique groove are arranged in line.

23. The pneumatic motorcycle tire according to claim 22, wherein the main portion of the first oblique groove is aligned with the third oblique groove of the next unit pattern on both sides of the axially outer part of the narrow oblique groove of said next unit pattern.

24. The pneumatic motorcycle tire according to claim 1, wherein no groove other than the first oblique grooves is disposed in the tire equator.

* * * * *